United States Patent Office 3,705,183
Patented Dec. 5, 1972

3,705,183
NOVEL CROSSLINKED CHROMIUM COMPLEXES
Fred Lee Bunger and Earl Phillip Moore, Jr., Wilmington, Del., assignors to E. I. du Pont de Nemours and Company, Wilmington, Del.
No Drawing. Filed Oct. 12, 1970, Ser. No. 80,215
Int. Cl. C07f *11/00*
U.S. Cl. 260—438.5 C      7 Claims

ABSTRACT OF THE DISCLOSURE

Adhesion between thermosetting resins and inorganic or organic fillers is enhanced by treatment of the filler material, prior to forming a composite with the resin, with a solution of a chromium complex formed by reaction of a Cr(III) salt with a $C_2$-$C_{11}$ monocarboxylic acid and with an organic molecule having two functional groups independently selected from hydroxyl, amino groups, and carboxyl. Composites made in this manner are resistant to degradation by hot water.

BACKGROUND OF THE INVENTION

This invention relates to novel chromium complex coupling agents which are useful in enhancing adhesion between thermosetting resins and organic or inorganic fillers. This invention further relates to a method of treating fillers with novel chromium complexes prior to the incorporation of the fillers into the resin and to resin-filler composites in which the filler material has been treated with novel chromium complexes.

Various Werner type complexes of chromium have been reported in the past to effect chemical bonding between diverse materials. Such complexes are described, for instance, in U.S. Pats. Nos. 2,544,666 and 2,544,668 (both to Goebel and Iler) and 3,310,457 (to Trebilcock). The main use of these complexes has been in bonding glass fibers to plastics.

Clean glass fibers imbedded in plastics give rather low composite strengths. The fibers have been, therefore, traditionally treated with compositions which enhance their coupling with the resin. These coupling compositions can be applied to the glass immediately after forming from a bushing or after the glass has been formed into mats or cloth. The composition applied immediately after forming glass fibrils generally contains processing aids and may or may not contain a coupling agent; this composition is called a "size." For maximum composite strength, the sized glass is processed into textile goods and this temporary size is burned off in a gas-fired furnace. This glass is now called heat-cleaned glass. The heat-cleaned glass is then treated with a "finish" containing the coupling agent. If the fibrils from a bushing receive the coupling agent in the size treatment, the process is called "permanent sizing." More is demanded of the coupling agent in permanent sizing since the coupling agent must overcome the diluting effect of the other size components.

While prior art chromium complexes effectively increased the bond strength between the glass fibers and the resin, such bonds were subject to a gradual attack by water which eventually caused degradation of the composite. This, of course, would be very undesirable for fabricated articles which are in prolonged contact with water, such as boats, water pipes, or tubing. There is a need, therefore, for a bond-enhancing composition which would be resistant to deterioration by prolonged contact with water.

SUMMARY OF THE INVENTION

According to this invention, it has now been discovered that certain novel Cr(III) complexes are particularly suitable for enhancing the chemical bonding of thermosetting resins to fillers, and that the resulting bonds are very resistant to attack by water, even on prolonged contact at a higher temperature.

These novel complexes can be schematically represented by one of the following general Formulas 1 and 2, which are intended to be no more than rough pictorial representations of two of many possible chemical structures

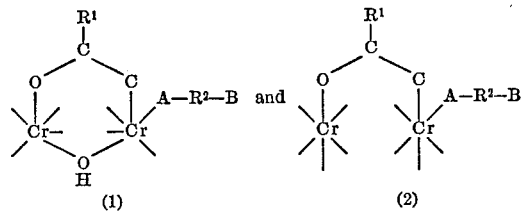

In the above formulas, $R^1$ is a $C_1$-$C_{10}$ radical, which can be substituted with halogen atoms or with functional groups; and the A—$R^2$—B grouping is derived from an organic compound containing two functional groups, A and B, which can complex to chromium. The A—$R^2$—B grouping can be considered to be a bidentate ligand. If either A or B is carboxyl, each oxygen atom of the carboxyl can coordinate with the same chromium atom. $R^2$ is a $C_1$-$C_{12}$ organic group which connects A and B. Each one of the groups A and B can independently be —OH, an amino group, or —COOH. The amino group may be primary, secondary or tertiary. When the ligand is oxalic acid, each of A and B is COOH, and $R^2$ is absent.

DETAILED DESCRIPTION OF THE INVENTION

The novel compounds of the present invention are complexes of trivalent chromium, Cr(III), Chromium is derived from either water-soluble or solvent-soluble Cr(III) salts such as $CrCl_3$ or $Cr(OH)Cl_2$. A basic salt, such as $Cr(OH)Cl_2$, is preferred but not required. When such a basic salt is used, it is believed that a cyclic structure corresponding to Formula 1, above, is formed. It is convenient to express the basicity of a basic salt in terms of the percentage of the original ions which are replaced by OH groups. Thus, for instance, $CrCl_3$ has 0% basicity; $Cr(OH)Cl_2$ has a 33⅓% basicity; and $Cr(OH)_2Cl$ has a 66⅔% basicity. It is not advisable to have chromium compounds which are more than 50% basic because the stability of the resulting complexes in water decreases below practical limits. It is believed that complexes obtained from Cr(III) salts of 0% basicity have a structure corresponding to Formula 2, above.

The salt is combined with the carboxylic acid, $R^1$—COOH, and with the crosslinking bidentate organic ligand. The chromium atoms in the final product have the same +3 charge they had in the starting salt. The corresponding anions, such as $Cl^{-1}$ or $OH^{-1}$, derived from the starting salt, are called counterions. Suitable representative counterions include, for example, $NO_2^{-1}$, HCOO⁻, CH₃COO⁻, and Br⁻. It is readily apparent that the counterions are the anions of monobasic inorganic or organic acids. Other groups which can be associated with the chromium atoms can be neutral species, held by auxiliary valence bonds. A typical such group is the aquo group ($H_2O$). Solvent molecules, such as alcohol molecules, can be similarly associated.

The crosslinking organic ligand can, naturally, combine with a different chromium atom at each end. The resulting crosslinked molecule is distinctly different from the prior art polymeric compounds in which complexes were polymerized by the formation of Cr—O—Cr bridges.

The bonds between Cr and the ligands (both the carboxylic acid, $R^1$—COOH, and the bidentate ligand, A—$R^2$—B,) are Werner-type bonds, rather than ordinary ionic or covalent bonds. Chromium can combine or "coordinate" with up to six groups, which can be held within the complex by the combined principal and auxiliary valances of the central chromium atom.

The carboxylic acid, $R^1$—COOH, coordinates with two atoms of chromium through its carboxyl group. The $R^1$ group can contain, for instance, a double bond, hydroxyl groups, amino groups, etc. Representative carboxylic acids are: methacrylic, gallic, gluconic, crotonic, sorbic, acrylic, vinylacetic, aminobenzoic, hydroxybenzoic, and aminoacetic (glycine).

The bidentate ligand A—$R^2$—B essentially consists of the functional groups A and B and the connecting group $R^2$. This connecting group preferably has a structure which prevents both functional groups of the bidentate ligand to coordinate with the same chromium atom. In the preferred ligands, $R^2$ will have two carbon atoms; and in the most preferred case, $R^2$ will be —CH=CH—. The $R^2$ portion of the molecule can contain substituents, such as halogen atoms, ether and thioether groups, and reactive sites which enhance adhesion to the resin.

A few representative examples of suitable organic bidentate ligands A—$R^2$—B are presented below in Table I.

TABLE 1

| A | R₂ | B | Chemical compound |
|---|---|---|---|
| HO₂C— |  | —CO₂H | Oxalic acid. |
| HO₂C— | —CH₂— | —CO₂H | Malonic acid. |
| HO₂C— | —CH=CH— | —CO₂H | Fumaric acid, maleic acid. |
| HO₂C— |  | —CO₂H | Terephthalic acid. |
| HO₂C— | -CH₂-CH₂-CH₂=CH₂- | —CO₂H | Muconic acid. |
| HO₂C— |  | —CO₂H | Cyclohexanedicarboxylic acid. |
| HO₂C— | —C₄H₈— | —CO₂H | Adipic acid. |
| H₂N— | —C₂H₄— | —NH₂ | Ethylenediamine. |
| H₂N— |  | —NH₂ | Diaminobenzene. |
| HO— |  | —OH | Hydroquinone. |
| HO— | —C₂H₄— | —OH | Ethylene glycol. |
| HO— | —CH₂— | —CO₂H | Hydroxyacetic acid. |
| HO— |  | —CO₂H | Hydroxybenzoic acid. |
| HO— | —CH₂—(CHOH)₄— | —CO₂H | Gluconic acid. |
| H₂N— | —CH₂— | —CO₂H | Glycine. |
| H₂N— |  | —CO₂H | Aminobenzoic acid. |
| H₂N— | —C₂H₄— | —OH | Aminoethanol. |
| H₂N— |  | —OH | Aminophenol. |

The chromium complexes of this invention are dark green to dark blue and are either water-soluble or alcohol-soluble. They are prepared by combining the chromium salt, the monocarboxylic acid, and the cross-linking bidentate organic ligand. The reaction of these three materials can be carried out in a variety of solvents such as water, alcohols, ethers or ketones. Isopropyl alcohol is the preferred reaction medium. The alcohols are chosen over other solvents because of the good solubility of the reaction product in the alcohols and their relatively low cost.

The sequence of reactions of the two organic materials with the chromium is relatively unimportant. In the preferred method, a solution of a basic chromium salt in isopropyl alcohol is heated above 30° C., even up to the boiling point, and the monocarboxylic acid, $R^1$COOH, is added. Heat is maintained for a period of time. After this complexing step, the bidentate organic ligand A—$R^2$—B is added and heating is continued. The reaction time and temperature can be varied. When the temperature is increased, the required time is decreased; similar results are obtained, for example, when each step is carried out for 70 minutes at 40° C. and for 30 minutes at reflux.

The molar ratio of chromium to the organic ligands can be varied over a wide range without impairing the desirable properties of the final chromium complex. A molar ratio of chromium to the monocarboxylic acid of 20:1 to 1:1.5 is operable, but a ratio within the range of 4:1 to 1:2 is preferred because it ultimately results in the strongest bond between the resin and the filler. Similarly, the molar ratio of chromium to the crosslinking bidentate ligand from 50:1 to 1:2 can be used, but the range of 10:1 to 1:2 is preferred.

The final concentration of the chromium complex in a solvent is dependent upon the solubility of the complex. In isopropyl alcohol, the usual chromium concentration is from 0.5 to 10% chromium by weight. Some solutions of chromium complexes in isopropyl alcohol have been prepared with a chromium level as high as 15% by weight.

The starting Cr(III) salts are well known chemical compounds which can either be obtained from commercial sources or made according to reported methods. Certain basic salts of Cr(III) can, for instance, be made by reduction of a chromium compound of higher valency with an alcohol. Such higher valency chromium compounds include, for example, chromic oxide and chromyl chloride. This procedure is described, for instance, in the above-cited U.S. Pat. 2,544,666. The starting organic ligands, both of the $R^1$COOH type and the A—$R^2$—B type, either are commercially available or can be made by methods well known to those skilled in the art.

The compositions of this invention can be applied to any of a wide variety of resin-reinforcing or filling materials. For maximum composite strength, the resin usually is reinforced with glass fibers such as "E" glass fiber, pure silica fibers, refractory aluminosilicate glass fibers, or glass wool. Other fibers which can be used as resin-reinforcing materials include carbon fibers, boron deposited on tungsten fibers, silicon carbide fibers, as well as whiskers of some metals. The compositions of this invention are also effective on natural fibers, such as cotton and sisal. Finely divided reinforcing materials such as kaolin, alumina, zircon, colloidal amorphous silica, perlite, fly ash, and in general any finely divided particulate refractory material can also be used as fillers for reinforcing a synthetic resin. The adhesion of all such fillers to the resin is enhanced by treatment with the chromium complexes of the present invention.

Suitable thermosetting resins which can be strengthened with reinforcing or filling materials treated with compositions of this invention include polyester resins, epoxy resins, phenol-formaldehyde resins, urea-formaldehyde resins, melamine-formaldehyde resins, alkyds, acrylic resins and methacrylic resins. All such resins are well known in the art.

The process of this invention is conveniently carried out by first treating the filler or reinforcing material with the chromium complex and then combining such treated material with the resin in any convenient manner known to the art.

For most application, the chrome complex of this invention is diluted prior to its application to a substrate. The chromium concentration in the final solution preferably should not exceed about 2% by weight. Although virtually any polar, organic solvent can be used, water is the preferred solvent since it is inexpensive, nontoxic, and nonflammable. Wetting of the substrates can be assisted by addition of a nonionic surfactant or of an alcohol. Useful nonionic surfactants include, for example, polyhydroxy alcohols and polyglycol ethers. Useful alcohols include ethanol, isopropyl alcohol, butyl alcohol, tert-buty alcohol, and the like.

The above chromium-complex solutions are acidic, the pH being approximately 2.5–3.5. Such acidic solutions may sometimes weaken or tenderize the substrate and, therefore, should preferably be partially neutralized prior to use. The neutralization is best carried out with a nitrogen base, such as ammonia or an organic amine. The optimum pH range is about 4–6.5.

The diluted and, optionally, neutralized chromium complex can be applied to the substrate in any convenient manner. This can be done, for example, by dipping the substrate into the solution, by spraying the solution onto the substrate, or by painting the solution on the substrate. The coated substrate is then dried, and the chromium complex coating is cured at an elevated temperature. The drying and curing steps can be combined in one operation. However, it is possible to first dry the substrate at either ambient or elevated temperature, then cure the coating at about 100° C. or more. For example, a glass fabric can be dipped into a chromium complex; excess chromium solution is squeezed out; and the cloth is dried and cured at 110° for 15 minutes. Adequate curing of previously dried substrate is achieved by heating for about 2 minutes at 100° C. or 1 minute at 200° C.

This invention is now illustrated by the following representative examples of certain preferred embodiments thereof, wherein all parts, proportions, and percentages are by weight unless otherwise indicated.

EXAMPLE 1

A methacrylic acid-chromium complex (prepared according to the general procedure of U.S. Pat. 2,544,666 and 2,544,668) containing 2.9% chloride, 5.8% chromium and 5% methacrylic acid (200 parts) was added to a solution of 13.6 parts of fumaric acid in 214 parts of isopropyl alcohol, and the resulting solution was heated at reflux for 30 minutes. A dark-green solution of the chromium complex with methacrylic acid and fumaric acid was obtained.

EXAMPLE 2

A solution of a basic chromium salt having a basicity of 33⅓% was made by reducing chromic oxide (CrO₃) with isopropyl alcohol. Thus, a solution of 28.4 parts of chromic oxide in 55.5 parts of 37% hydrochloric acid was slowly added to a refluxing solution of 165.6 parts of isopropyl alcohol; then, 12.5 grams of methacrylic acid was added to the resulting Cr(III) solution, and refluxing was continued for 30 minutes. Terephthalic acid (12 parts) and 238 parts of isopropyl alcohol were added to 250 parts of the above solution. The resulting solution was refluxed for 30 minutes. The chrome complex of methacrylic acid and terephthalic acid gives a dark green solution in isopropyl alcohol, which is water-soluble and stable. In this context, the expression "stable" means that the complex solution does not show sediment formation on standing at room temperature for 48 hours.

EXAMPLE 3

A methacrylic acid-chromium complex (200 parts) (prepared by reduction of chromium oxide with isopropyl alcohol in the presence of hydrochloric acid and reaction of the resulting basic chromium salt with methacrylic acid, as described in Example 2, above), containing 5% methacrylic acid, 6% chromium, and 3% chloride was added to a solution of 227 parts of isopropyl alcohol and 27.2 parts of fumaric acid; this solution was refluxed for 30 minutes. The resulting dark green solution of the chromium complex of fumaric acid and methacrylic acid contained 3% chromium and was miscible with water in all proportions.

EXAMPLE 4

A methacrylic acid-chromium complex (250 parts) (prepared by reduction of chromium oxide with isopropyl alcohol in the presence of hydrochloric acid and reaction of the resulting basic chromium salt with methacrylic acid, as described in Example 2, above), 238 parts of isopropyl alcohol, and 18 parts terephthalic acid were heated together at reflux for 30 minutes. The resulting dark green chrome complex contains 3% chromium and is water-soluble.

Terephthalic acid is a part of the chromium complex since it does not precipitate out of aqueous solutions of the complex. Terephthalic acid itself is very insoluble in water. The precipitation test was carried out by adding 3 parts of each complex to 97 parts of water. When a solution of terephthalic acid in isopropyl alcohol is added to water in the same manner, terephthalic acid precipitates from the solution.

EXAMPLE 5

Sizing solutions, suitable for treating glass fibers, were prepared by combining one part of the chromium complex of each one of Examples 1–4, above, one part of a commercial polyvinyl acetate emulsion containing 55% solids, 0.2 part of a lubricant ("Cirrasol" 220, available from ICI-America in Stamford, Conn.) and 97.8 parts water. The pH of this size solution was adjusted with ammonium hydroxide to 4.5, and the solution was applied to heat-cleaned glass fibers rovings to a 50% wet pick-up. The rovings were dried in an oven at 110° C. for ten minutes. These sized glass fibers were cut into 30-inch lengths, tied in the middle with an end of a 20-inch copper wire, and soaked in a polyester-styrene-benzoyl peroxide resin solution. This polyester-styrene-benzoyl peroxide resin system contained 90 parts of a polyester resin consisting of 1 mole phthalic anhydride, 1 mole maleic anhydride, and 2.2 moles propylene glycol, esterified to an acid number of between 30 and 45; 10 parts of styrene; and one part of benzoyl peroxide. After soaking the sized glass fiber rovings in this polyester resin solution for 30 minutes, the rovings were pulled into an 18-inch Pyrex® glass tube with an inside diameter of approximately 0.155 inch, and the glass tube with its contents was heated in an oven at 110° C. for one hour. It was then allowed to cool, and the glass fiber-polyester resin composites were removed. The flexural strength of these composites was measured immediately after their preparation and after a two-hour exposure to boiling water. The strengths of these composites are recorded in Table 2, below.

TABLE 2

| | Flexural strength (10³ p.s.i.) [1] | |
|---|---|---|
| | Dry | Two-hour boil |
| Example: | | |
| 1 | 176.3 | 145.6 |
| 2 | 158.6 | 129.8 |
| 3 | 177.6 | 136.2 |
| 4 | 146.2 | 121.4 |
| No treatment (control) | 139.6 | 94.2 |

[1] Determined according to the ASTM procedure D–931. The polyester rods were cut into 4-inch lengths and broken in the middle on a tensile tester at a rupture speed of 0.05 inch per minute; and the flexural strengths were calculated from these data.

The above results show that a stronger bond between the glass fibers and resin is obtained on treatment with a chromium complex of the present invention than in the absence of such treatment. Especially noteworthy is the improvement of the bond strength in the case of samples subjected to a prolonged contact with boiling water.

We claim:
1. A composition comprising a complex of Cr(III) in which the nuclear chromium atoms are coordinated by Werner-type bonds with (1) a monocarboxylic acid, $R^1COOH$, where $R^1$ contains 1–10 carbon atoms, and (2) a crosslinking molecule, A—$R^2$—B, where A and B are independently selected from —OH, an amino group, and —COOH; and $R^2$ is an organic $C_1$–$C_{12}$ divalent radical; provided that when both functional groups are —COOH, $R^2$ can be absent.

2. A composition of claim 1 wherein the molar ratio of chromium $R^1COOH$ is within the range of 4:1 to 1:1.5, and the molar ratio of chromium to A—$R^2$—B is 10:1 to 1:2.

3. A composition of claim 1, wherein the monocarboxylic acid is gallic acid.

4. A composition of claim 1, wherein $R^1$ is methacrylic acid.

5. A composition of claim 4 wherein A—$R^2$—B is fumaric acid.

6. A composition of claim 1, wherein $R^2$ is the —CH=CH— group.

7. A composition of claim 6, wherein A—$R^2$—B is fumaric acid.

References Cited

UNITED STATES PATENTS

| | | | |
|---|---|---|---|
| 2,524,803 | 10/1950 | Iler. | |
| 2,544,667 | 3/1951 | Goebel et al. | |
| 2,544,668 | 3/1951 | Goebel et al. | |
| 2,549,220 | 4/1951 | McLaren | 260—438.5 R X |
| 2,904,571 | 9/1959 | La Fleur | 260—438.5 R |
| 2,918,483 | 12/1959 | Varul | 260—438.5 R |
| 3,185,717 | 5/1965 | Trebilcock | 260—438.5 C |

FOREIGN PATENTS

| | | | |
|---|---|---|---|
| 729,653 | 3/1966 | Canada | 260—438.5 C |
| 923,382 | 4/1963 | Great Britain | 260—438.5 C |
| 970,494 | 9/1964 | Great Britain | 260—438.5 C |

TOBIAS E. LEVOW, Primary Examiner

H. M. S. SNEED, Assistant Examiner